(12) United States Patent
Colwell

(10) Patent No.: US 8,888,509 B2
(45) Date of Patent: Nov. 18, 2014

(54) ELECTRICAL CONNECTOR AND METHOD OF ASSEMBLING SAME

(75) Inventor: Robert Colwell, Owosso, MI (US)

(73) Assignee: Allied Motion Technologies Inc., Englewood, CO (US)

(*) Notice: Subject to any disclaimer, the term of this patent is extended or adjusted under 35 U.S.C. 154(b) by 0 days.

(21) Appl. No.: 13/549,139

(22) Filed: Jul. 13, 2012

(65) Prior Publication Data

US 2014/0017913 A1    Jan. 16, 2014

(51) Int. Cl.
*H01R 13/719* (2011.01)
*H01R 11/01* (2006.01)
*H01R 39/38* (2006.01)
*H01R 43/00* (2006.01)
*H01R 39/46* (2006.01)

(52) U.S. Cl.
CPC .............. *H01R 13/719* (2013.01); *H01R 11/01* (2013.01); *H01R 39/383* (2013.01); *H01R 43/00* (2013.01); *H01R 39/46* (2013.01)
USPC ...................................... 439/76.1

(58) Field of Classification Search
USPC .................. 439/76.1, 620.07, 620.01, 67
See application file for complete search history.

(56) References Cited

U.S. PATENT DOCUMENTS

| | | | |
|---|---|---|---|
| 4,419,621 A * | 12/1983 | Becker et al. .................. | 324/548 |
| 4,781,624 A * | 11/1988 | Shepherd .................... | 439/620.1 |
| 5,219,305 A | 6/1993 | Kawaguchi et al. | |
| 5,286,221 A * | 2/1994 | Fencl et al. .............. | 439/607.53 |
| 5,362,243 A * | 11/1994 | Huss et al. ................... | 439/76.1 |
| 5,415,569 A * | 5/1995 | Colleran et al. ......... | 439/620.16 |
| 5,509,825 A * | 4/1996 | Reider et al. ............. | 439/620.09 |
| 6,086,384 A * | 7/2000 | Fuerst et al. .................... | 439/67 |
| 6,139,368 A * | 10/2000 | Bogese, II ................ | 439/620.17 |
| 6,328,603 B1 * | 12/2001 | Chang ....................... | 439/620.19 |
| 6,413,119 B1 * | 7/2002 | Gabrisko et al. ........... | 439/620.1 |
| 6,537,085 B2 * | 3/2003 | Na ................................. | 439/76.1 |
| 6,752,638 B2 * | 6/2004 | Na ................................ | 439/76.1 |
| 6,808,422 B2 * | 10/2004 | Chengalva ............... | 439/620.07 |
| 6,942,498 B2 * | 9/2005 | Na ................................ | 439/76.1 |
| 7,878,683 B2 * | 2/2011 | Logan et al. ............. | 362/249.02 |
| 2009/0093160 A1 | 4/2009 | Hsieh et al. | |

FOREIGN PATENT DOCUMENTS

| | | |
|---|---|---|
| EP | 0663705 A2 | 7/1995 |
| EP | 2461039 A1 | 6/2012 |
| JP | 05015361 U | 2/1993 |
| JP | 2000195604 A | 7/2000 |

* cited by examiner

*Primary Examiner* — Alexander Gilman
(74) *Attorney, Agent, or Firm* — Hodgson Russ LLP

(57) ABSTRACT

An electrical connector and method assembling the same. A device may comprise a connector frame, a flexible printed circuit board connected to the connector frame, a filter mounted to the flexible printed circuit board; and at least one terminal mounted to the flexible printed circuit board and in electrical communication with the filter. A method to assemble an electrical connector may comprise: providing a flexible printed circuit board having two conductive pads and a filter in electrical communication with the two conductive pads; connecting each conductive pad to a corresponding terminal; inserting each terminal into corresponding holders in a connector frame; placing the flexible printed circuit board in a curved pathway of the connector frame to form a connector subassembly; and inserting the connector subassembly into a connector housing. The filter may have three electrical connections, two are connected to the terminals and one is connected to ground.

7 Claims, 14 Drawing Sheets

ELECTRICAL CONNECTOR AND METHOD OF ASSEMBLING SAME

FIELD OF THE INVENTION

The present invention relates to an electrical connector, for example an electrical connector for an electric machine.

BACKGROUND OF THE INVENTION

Certain electric systems include electric machines, such as electrical motors, that can create significant amounts of electrical noise, which can adversely affect other, more sensitive components. In order to reduce this electrical noise, filters are often added to these systems. And, the placement of such filters within the system is an important factor to the effectiveness of electrical noise reduction. For example, in an system with an electrical motor, it may be preferable to place the filter close to the point where the lead wires exit the motor housing.

Many systems include standardized electric motors that have electrical connectors. Such electrical connectors allow these motors to be more easily "plugged-in" to the system. In this way, systems with electrical motors can be more easily designed using readily-available, modular components, and those modular components can be more readily replaced, using the removable electrical connectors, should the need arise.

As previously stated, it is often desirable to include a noise filter when an electric motor is used in a system. Where the electric motor has a modular design with a removable electrical connector, it is convenient to include the filter as part of the motor module. Considering the design goal of locating the filter closer to the lead wires and/or electrical connector, previous motor designs have included the filter within the electrical connector.

While the components of many systems are subjected to significant stresses, electrical connectors are uniquely susceptible due to the non-permanent nature of their connection to a mating connector. Furthermore, the act of forming and breaking the mating connections creates additional stresses that electrical connectors must be able to withstand.

Previous attempts at integrating filters in connectors have used rigid printed circuit boards and/or overmolding. Overmolding is an injection molding process where one material (usually an elastomeric material) is molded "over" a secondary, rigid substrate material (such as a rigid printed circuit board).

The rigid printed circuit board and overmolding techniques were seen to be advantageous for electrical connectors because rigid bodies may be able to withstand environmental stresses while maintaining a consistent electrical connection in a system. For example, some electrical connectors are used with sensors in close proximity to an engine's combustion chambers. Previous electrical connector designs have utilized rigid components, such as rigid printed circuit boards ("PCBs") to reduce and withstand mechanical and physical stresses, shock, vibration, and various thermal conditions.

However, the use of overmolding has shortcomings. First, the overmolding process is costly and time consuming as it requires two sequential molds. Furthermore, during the overmolding process, the substrate material must be stationary. Otherwise, it is difficult to repeatedly overmold substrates with a consistent outcome. As such, when overmolding flexible components, additional measures must be taken to ensure that the substrate does not move during the overmolding process. These additional measures increase the complexity, and therefore, the cost to produce electrical connectors. Also, filters can be bulky and susceptible to damage, especially if exposed to high-temperature assembly techniques such as overmolding.

Rigid components, such as PCBs, can be difficult to design into small form-factor housings (e.g., electrical connectors). There is generally a trade-off between the ability of a rigid component to fit into a small space and the ability of that component to be easily assembled. This trade-off creates a more costly and/or complex device.

Therefore, it is difficult to place filters in close proximity to the electrical connector and/or lead wires without increasing the cost and complexity of the connector.

SUMMARY OF THE INVENTION

The invention provides an electrical connector device and a method for making the electrical connector device. For example, the electrical connector device may be used with an electrical machine. The present invention solves the problems found in the prior art by mounting a filter to a flexible printed circuit board, thereby removing the need for overmolding, and placing the filter as close as possible to the electrical connector. Further, the flexibility of the flexible printed circuit board provides the unexpected result of simplifying assembly of the electrical connector while reducing stress on the electrical contacts between the flexible printed circuit board and a terminal.

Here, "terminal" refers to a conductive member that interfaces with the mating counterpart of the electrical connector. For example, the terminal may be a pin, blade, cavity, or slit. The terminal need not be encompassed by its counterpart, but may only abut the counterpart so as to make an electrical connection. For example, a terminal may be the prongs and socket on a standard electrical plug, or the metallic contacts of a USB connector and slot.

The present invention may be embodied as an electrical connector comprising a connector frame, a flexible printed circuit board connected to the connector frame, a filter mounted to the flexible printed circuit board, and at least one terminal mounted to the flexible printed circuit board and in electrical communication with the filter. The electrical connector may further comprise a connector housing configured such that the connector frame is substantially disposed within the connector housing.

In one embodiment, the filter may be in electrical communication with a common ground by way of the connector housing. The filter may comprise a multilayer ceramic chip capacitor, or discrete components (e.g., inductors, capacitors, resistors, etc.).

In one embodiment, the flexible printed circuit board may be disposed in a curved pathway of the connector frame. The flexible printed circuit board may also have a number of leg portions corresponding with the number of terminals in the electrical connector. The at least one terminal may be mounted to the flexible printed circuit board at the corresponding leg portion.

In another embodiment, the connector frame may have a projection and the flexible printed circuit board may have an aperture capable of alignment with the connector frame's projection. Here, "projection" may refer to any retention features or guiding features (such as a pin or nub) that extend from a surface of the connector frame in order to align or retain the flexible printed circuit board. "Aperture" may refer to any guiding feature (such as a hole or cut-out) present in the flexible printed circuit board in order to align the flexible printed circuit board with the connector frame's projection(s).

The invention may also be embodied as a method of making an electrical connector. One such method comprises the steps of: providing a flexible printed circuit board having two conductive pads and a filter in electrical communication with the two conductive pads; connecting each conductive pad to a corresponding terminal; inserting each terminal into corresponding holders in a connector frame; placing the flexible printed circuit board in a curved pathway of the connector frame to form a connector subassembly; and inserting the connector subassembly into a connector housing.

In one embodiment of the method, the step of placing the flexible printed circuit board in a curved pathway of the connector frame further comprises the sub-step of inserting a projection of the connector frame into an aperture of the flexible printed circuit board.

In another embodiment of the method, the housing is electrically conductive and the method further comprises the step of electrically connecting the filter to the housing. The connecting steps may be performed by soldering.

In one embodiment, the method further comprises the step of electrically connecting leads to the at least two terminals.

BRIEF DESCRIPTION OF THE DRAWINGS

For a fuller understanding of the nature and objects of the invention, reference should be made to the accompanying drawings and the subsequent description. Briefly, the drawings are.

FURTHER DESCRIPTION OF THE INVENTION

Figure 1A:
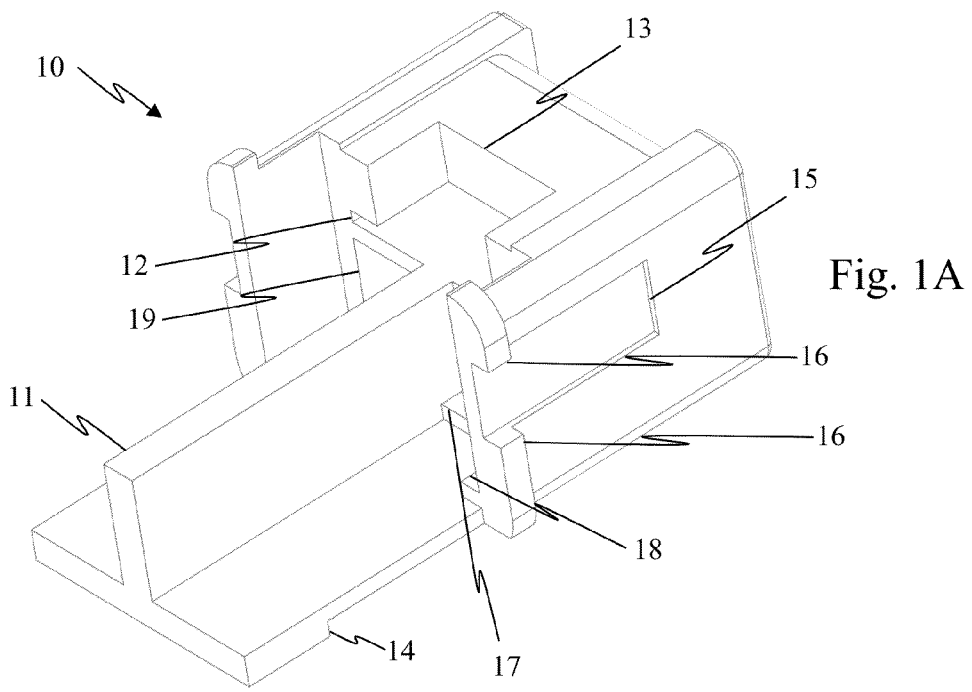
FIGS. 1A and 1B show multiple perspective views of a connector frame according to an exemplary embodiment of the invention.
Figure 1B:
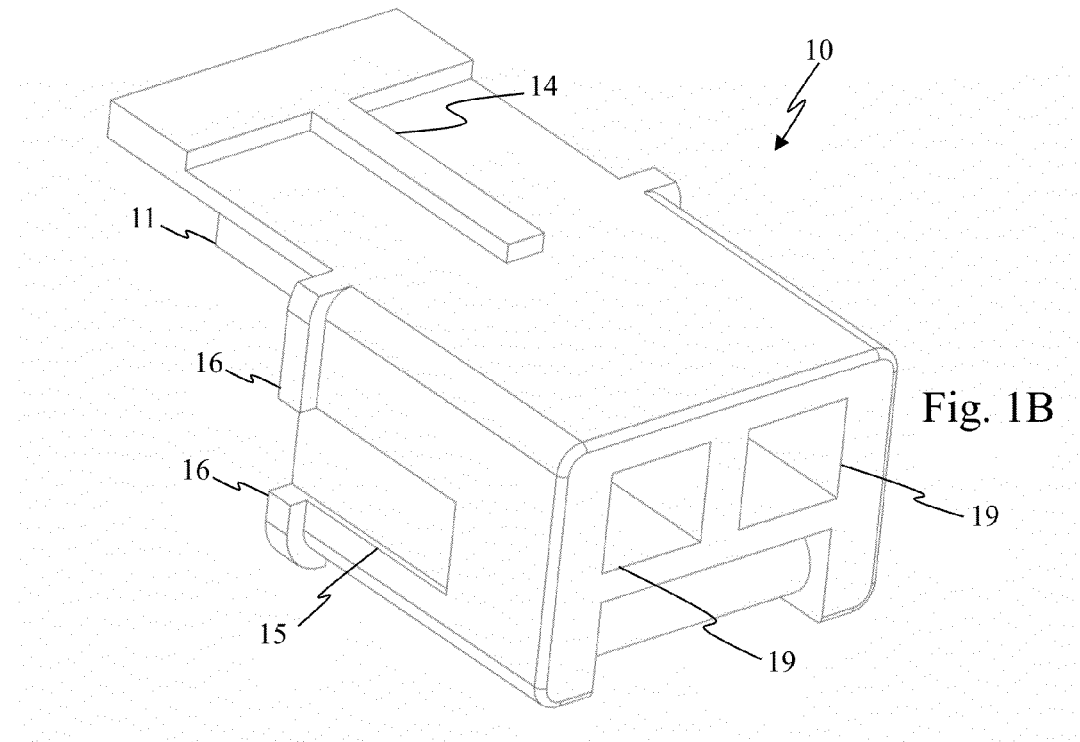

The present invention may be embodied as an electrical connector for an electrical machine. As used herein, an "electrical machine" may refer to any device, including but not limited to, devices that produce or require electrical energy, transmit data using electrical energy, convert mechanical energy to electrical energy, convert electrical energy to mechanical energy, or changes alternating current from one voltage level to a different voltage level. One example of an electrical machine is an electric motor.

The connector frame may be formed from a non-conductive, material such as a plastic. The connector frame may be rigid or semi-rigid. The connector frame may be formed to accept counterpart mating terminals. The connector frame may also be formed to isolate various electrical components, for example, by providing a non-conductive partition between ground and powered portions of the connector.

In another embodiment, the connector frame is formed such that the other components of the electrical connector can snap into place for easy assembly. For example, the connector frame may have small tabs that align and guide other components of the electrical connector.

The flexible printed circuit board is connected to the connector frame. The flexible printed circuit board is formed such that it can conform to a desired shape or bend around features of the connector frame. In one embodiment, the flexible printed circuit board is a single-sided flex circuit having a single conductor layer made of either a metal or conductive (metal filled) polymer on a flexible dielectric film. Holes may be formed in the base film to allow component leads to pass through for interconnection, normally by soldering. Components may also be surface mounted to a flexible printed circuit board. Single sided flex circuits may be fabricated with or without protective coatings as cover layers or cover coats.

The flexible printed circuit board may also have one or more mounting points at which other components can be electrically connected. The mounting points may be electrically conductive areas such as pads or contacts. The flexible printed circuit board may be disposed in a curved pathway of the connector frame. In one embodiment, the flexible printed circuit board is capable of being folded and threaded through apertures in the connector frame.

In another embodiment, the flexible printed circuit board may have a number of leg portions corresponding with the number of terminals in the connector. The leg portions may be tabs extending from the printed circuit board. The at least one terminal may be mounted or electrically connected to the flexible printed circuit board at the corresponding leg portion. In this way, only one terminal would be mounted or electrically connected to each leg portion. In other embodiments, multiple terminals may be mounted or electrically connected to a single leg portion.

The filter may be mounted to the flexible printed circuit board through soldering or any other method that maintains an electrical connection between the filter and the flexible printed circuit board (e.g., clamping). The filter may comprise multiple discrete components (e.g., inductors, capacitors, resistors, etc.) or a single component package. The filter may also be a multilayer ceramic chip capacitor. In one embodiment, the filter is an X2Y® capacitor available from X2Y Attenuators LLC, 2730-B West 21$^{st}$ Street, Erie, Pa. 16506-2972.

In another embodiment, the flexible printed circuit board has a third conductive pad which is electrically connected to the motor housing and eventually to ground. The filter may also have three electrical connections, each connection corresponding to one of the flexible printed circuit board's conductive pads. For example, two of the filter's electrical connections are connected to the terminals, and one of the filter's electrical connections is connected to ground. In one embodiment, a capacitor is placed between a first terminal and ground, a second terminal and ground, and the first terminal and the second terminal At least one terminal may be mounted to the flexible printed circuit board. The at least one terminal may be formed from a conductive substance, such as a metal. In one embodiment, the terminals may be "male" or "female." The contacts may be configured to insert or receive, a mated terminal In another embodiment, the terminal may have two ends, the first end configured to mate with another terminal, and the second end configured to be electrically connected to a lead (e.g., wire, electrical connection, etc.) from the electrical machine. The second end of each terminal may be connected (e.g., soldered) to a mounting point on the flexible printed circuit board. The terminal may also be configured with features that align and hold the terminal at least partially within the connector frame.

The at least one terminal is in electrical communication with the filter. The electrical communication may be indirect (e.g., where other components, such as wires or the flexible printed circuit board, electrically connect the terminal to the filter). The method may also comprise the step of electrically connecting lead wires to the at least one terminals.

In another embodiment, the electrical connector may further comprise a connector housing. The connector housing may be formed from a conductive or non-conductive material. The housing may be configured such that the connector frame can be substantially disposed within the connector housing. For example, portions of the connector frame, or a terminal, may extend beyond the connector housing. The connector housing may not enclose sections of the connector frame that lead to the electrical machine.

The housing may have features that align the connector frame within the housing or hold the connector frame into the housing. For example, the connector frame may have a projection such as a pin or notch, and the connector housing may have an aperture, or other physical feature, capable of alignment with the projection of the connector frame.

In one embodiment, the connector housing is formed from a conductive material, such as metal, and is connected to a common ground. For example, the housing can be connected to a common ground when the electrical connector is mated, or through a common ground in the flexible printed circuit board. The filter may also be in electrical communication with the common ground by way of the connector housing. For example, the filter may be electrically connected to a trace on the flexible printed circuit board, the trace electrically connected to the connector housing, and the connector housing electrically connected to a common ground. Through this series of electrical connections, the filter is electrically connected to ground.

In some embodiments, two or more common grounds may be connected together to create a Faraday cage capable of reducing electrical noise and interference. For example a Faraday cage may be formed around a connected electrical connector, thereby reducing or eliminated electromagnetic interference propagated or emitted by the electrical connector.

The present invention may also be embodied as a method of making an electrical connector. The method may comprise the step of providing a flexible printed circuit board having two conductive pads and a filter in electrical communication with the two conductive pads. The filter may be in direct electrical communication with the two conductive pads, or indirect communication through traces on the PCB.

The method may also comprise the step of connecting each conductive pad to a corresponding terminal. The connecting step may be performed by soldering a terminal to a single conductive pad. In another embodiment, the terminal may be clamped, or otherwise connected to the conductive pad. A conductive pad may also be connected to more than one terminal The method may also comprise the step of inserting each terminal into corresponding holders in a connector frame. The holders may be recesses in the connector frame configured to align the terminals such that they can be mated with another electrical connector. The holders may also be features in the connector frame configured to hold the terminal in place.

The method may also comprise the step of placing the flexible printed circuit board in a curved pathway of the connector frame to form a connector subassembly. The flexible printed circuit board may be threaded through one or more apertures in the connector frame. In one embodiment, the step of placing the flexible printed circuit board in a curved pathway of the connector frame further comprises the sub-step of inserting a projection of the connector frame into an aperture of the flexible printed circuit board. The method may also comprise the step of inserting the connector subassembly into a connector housing. The method may also comprise the step of electrically connecting the filter to the housing wherein the housing is electrically conductive.

Exemplary Embodiments of the Invention

FIGS. 1-8 show an assembled electrical connector device attached to an electric machine according to one embodiment of the present invention. FIGS. 1A and 1B show multiple perspective views of a connector frame 10. The connector frame 10 is made from a non-conductive material, such as plastic. The connector frame may be molded or milled into its shape. In this embodiment, the connector frame has two holders 19 configured to accept one end of a terminal 30 (shown in FIG. 3). The holders 19 may be larger than terminal 30 ends or of a similar size in order to maintain a friction fit. A divider 11 may be used to separate multiple terminals 30. Here, the divider 11 is formed from the same piece of material as the rest of the connector frame 10. The connector frame 10 also has a slot 12 configured to accept the flexible printed circuit board 20 (shown in FIG. 2). The slot 12 may be of a similar size, or larger than, the printed circuit board 20.

Filter cavity 13 is configured to be of a similar size and shape as the filter 21 (shown in FIG. 2) to simplify aligning the flexible printed circuit board 20 in the connector frame 10. The filter cavity 13 may also be larger than the filter 21. In this embodiment, retention surface 15 is formed into the connector frame 10 and is configured to hold the connector frame 10 in a connector housing 40 (shown in FIG. 4). For example, a retention element 45 (also shown in FIG. 4) may be provided that frictionally abuts with retention surface 15 or the lip surrounding retention surface 15. The retention element 45 and the retention surface 15 are configured such that the connector housing 40 and the connector frame 10 snap together and become difficult to separate. Vertical guides 16 are configured to only permit the connector frame 10 to be inserted into the connector housing 40 at certain vertical alignments. The vertical guides 16 may make it easier for the connector frame 10 to be inserted into the connector housing 40 based on the tactile feedback provided during improper insertion (i.e., when the vertical guides 16 make contact with features of the connector housing 40.) Likewise, insertion guide 14 may also align the connector frame 10 with the connector housing 40.

Horizontal terminal guides 18 and vertical terminal guides 17 serve a similar purpose, except with the terminal 30 instead of the connector housing 40.

Figure 2A:
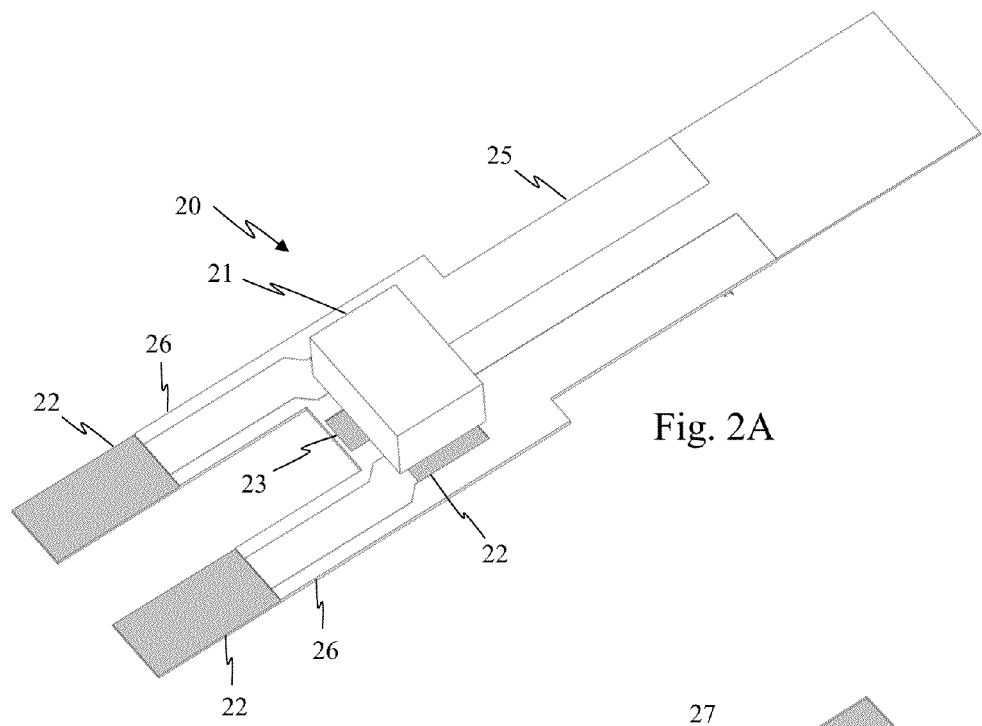
FIGS. 2A and 2B show multiple perspective views of a printed circuit board having a filter according to an exemplary embodiment of the invention.
Figure 2B:
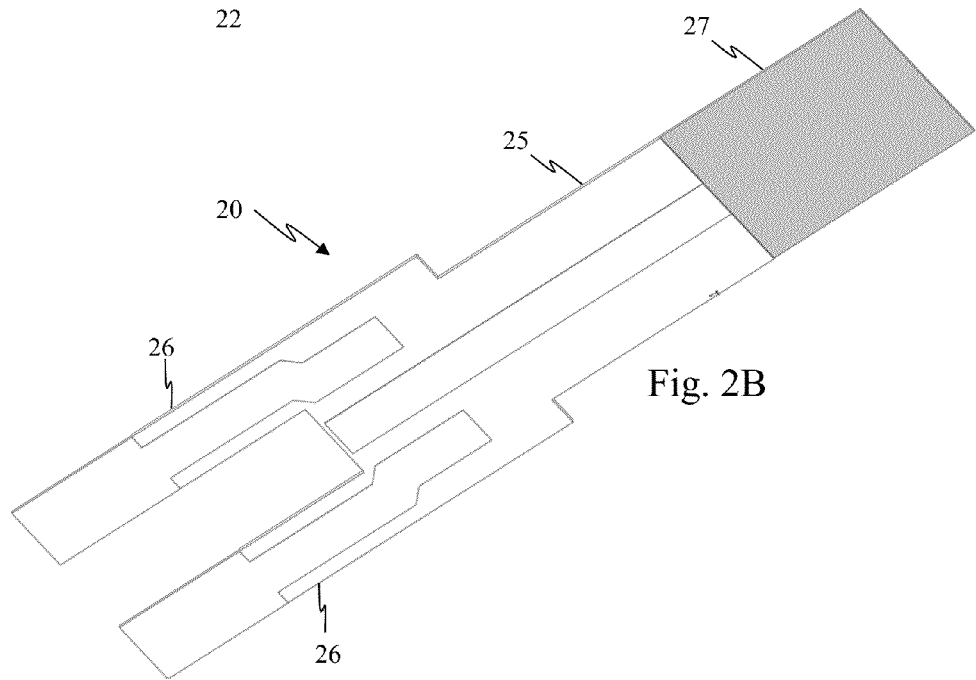

FIGS. 2A and 2B show multiple perspective views of the flexible printed circuit board 20. Here, the printed circuit board may be a double-sided flexible circuit having two conductive layers. The double-sided flexible circuit can be fabricated with a protective cover layer on both sides, and allows for a cross over connection between the conductive layers. In this way, conductive pads on one side of the flexible printed circuit board 20 may connect to other conductive pads on the opposite side of the flexible printed circuit board 20.

Here, a filter 21 is mounted to the flexible printed circuit board 20. The filter 21 may be configured to reduce the transmission or emission of electromagnetic interference or, more specifically, radio frequency interference. The filter is mounted to at least conductive filter mounts 22 and 23. Conductive filter mount 22 is in electrical communication with one conductive pad 22 of leg 26 of the flexible printed circuit board 20. For example, the filter mount 22 may be in electrical communication with a conductive pad 22 through a trace in the flexible printed circuit board 20. Conductive filter mount 23 acts as an electrical pathway through portion 25 which terminates at conductive pad 27. In FIGS. 2A and 2B, conductive portions exposed to the environment are indicated by gray shading.

Figure 3:
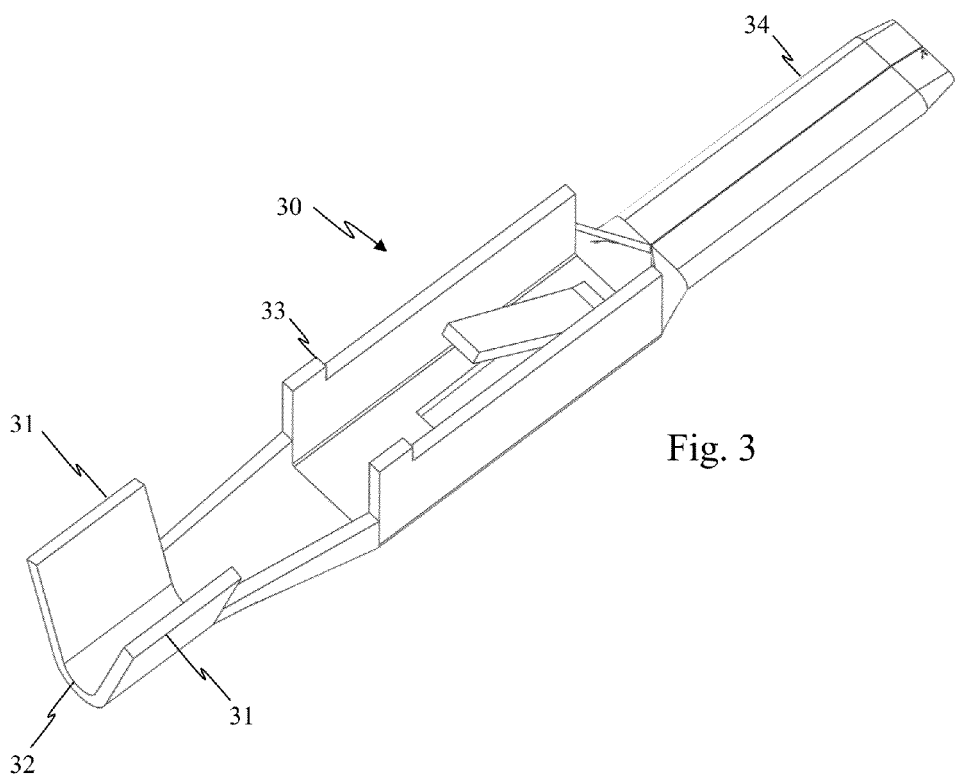
FIG. 3 shows a terminal according to an exemplary embodiment of the invention.

FIG. 3 shows a terminal 30. The terminal 30 is formed from a conductive material, such as metal. Here, the terminal 30 has a blade 34 configured to be inserted to a corresponding female adapter. Other configurations of the blade 34 are possible, including pins, slits, contacts, etc. The terminal 30 may have a retention portion 35 configured to guide and secure the terminal 30 within the connector frame 10. Terminal retention feature 33 is configured to limit the insertion of the terminal 30 in the connector frame 10 such that the terminal blade 34 is at a proper length. Lead end 32 has flanges 31 that can be used to crimp a lead (not shown) into electrical communication with the terminal 30. Here, the lead may be placed in the lead end 32 between flanges 31. Once in place, force is applied to flanges 31 such that the flanges 31 secure and hold the lead.

Figure 4A:
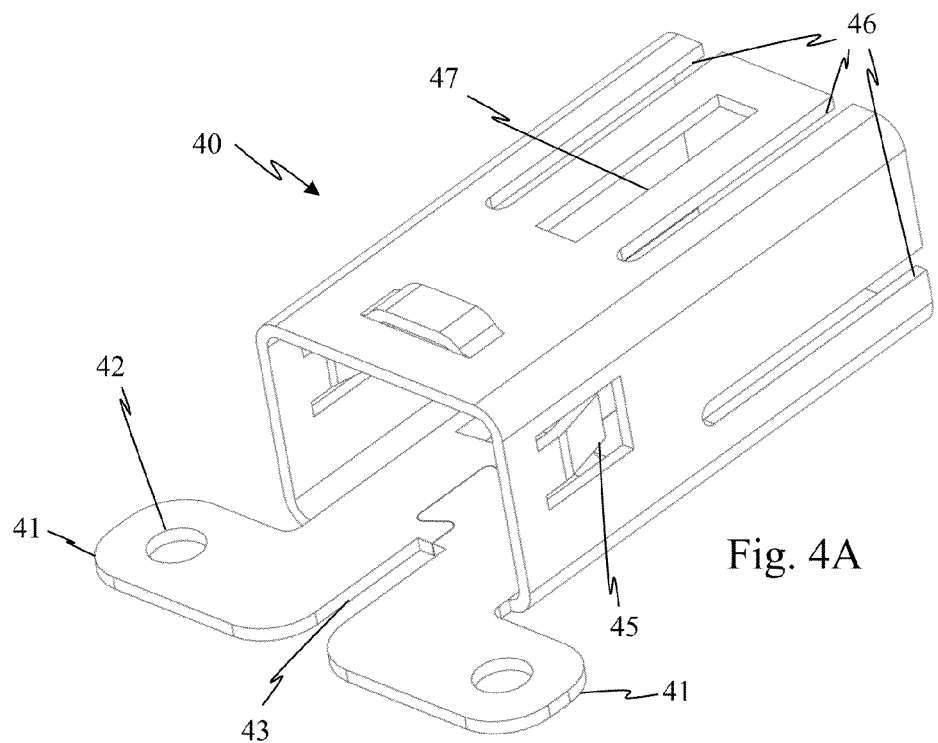
FIGS. 4A and 4B show multiple perspective views of a connector housing according to an exemplary embodiment of the invention.
Figure 4B:
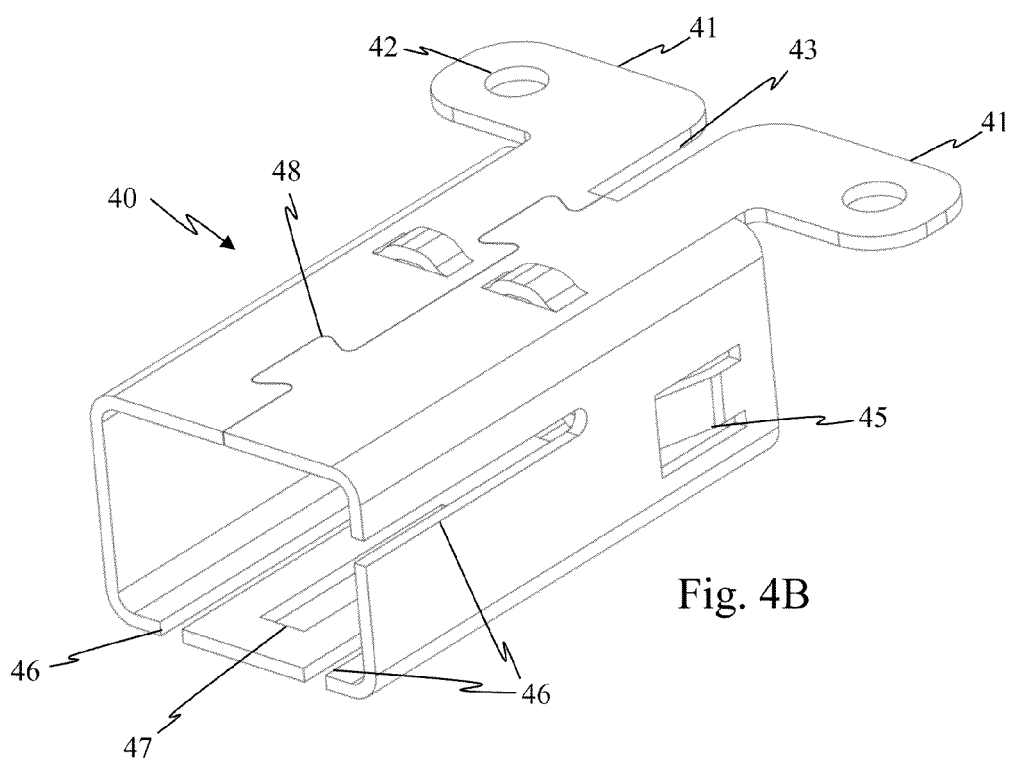

FIGS. 4A and 4B show multiple perspective views of a connector housing 40. Here, the connector housing 40 is constructed from a conductive material, such as metal. However, in other embodiments, the connector housing 40 may be constructed from a non-conductive material, such as plastic. The connector housing 40 has mounting flanges 41 that can be used to mount the connector housing 40 (and the entire electrical connector) to an electric machine. Apertures 42 are provided and configured to allow a fastener to secure the connector housing 40 to an electric machine. Guide groove 43 is provided to ensure the connector housing's 40 proper alignment with the electric machine. In this embodiment, retention member 45 is provided, as discussed above, to help secure the connector frame 10 to the connector housing 40. Also provided are mating grooves 46 and mating aperture 47. The mating grooves 46 may be provided to help align a corresponding electrical connector into electrical communication with the electrical connector of the invention. The mating aperture 47 may be configured to allow a mating flange to attach to the electrical connector, such that it cannot be removed by pulling the corresponding electrical connector away. For example, removal of the mated electrical connectors may require depressing the mating flange (to remove the flange from aperture 47) while pulling the corresponding electrical connector away.

Figure 5:
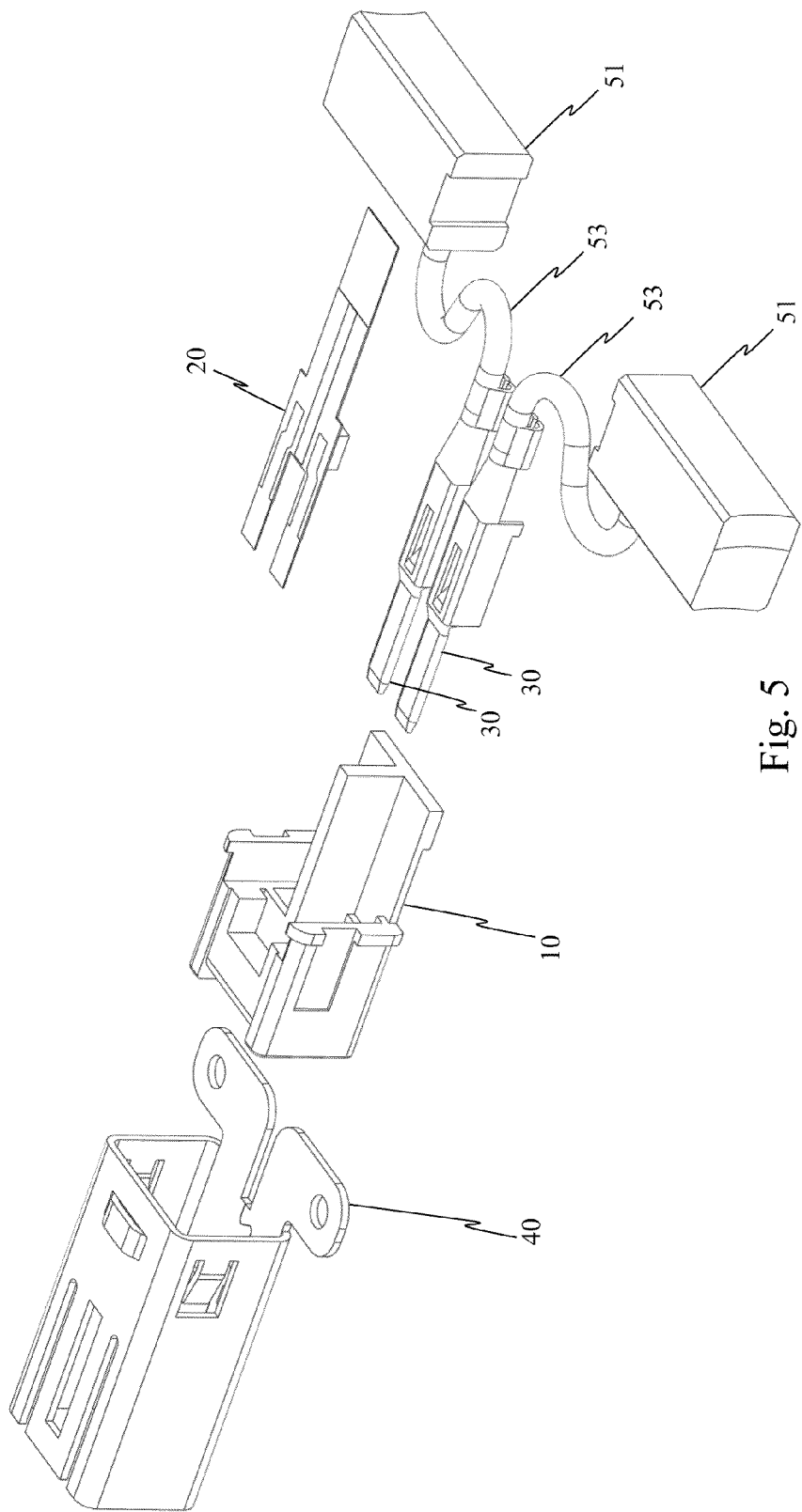
FIG. 5 shows an exploded view of an assembled electrical connector according to an exemplary embodiment of the invention.
Figure 6A:
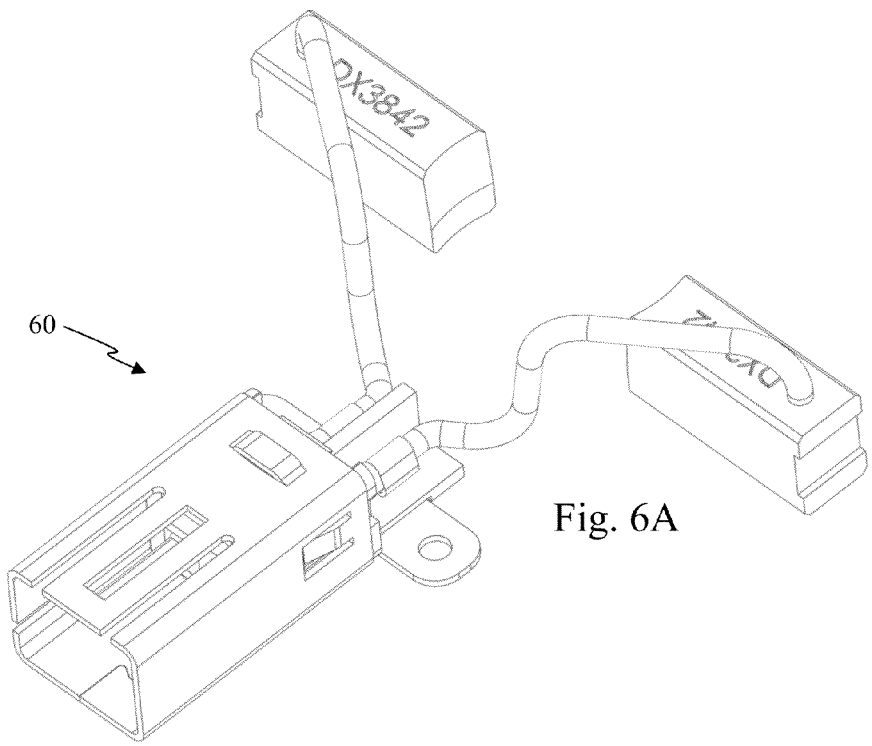
FIGS. 6A and 6B show multiple perspective views of an assembled electrical connector according to an exemplary embodiment of the invention.
Figure 6B:
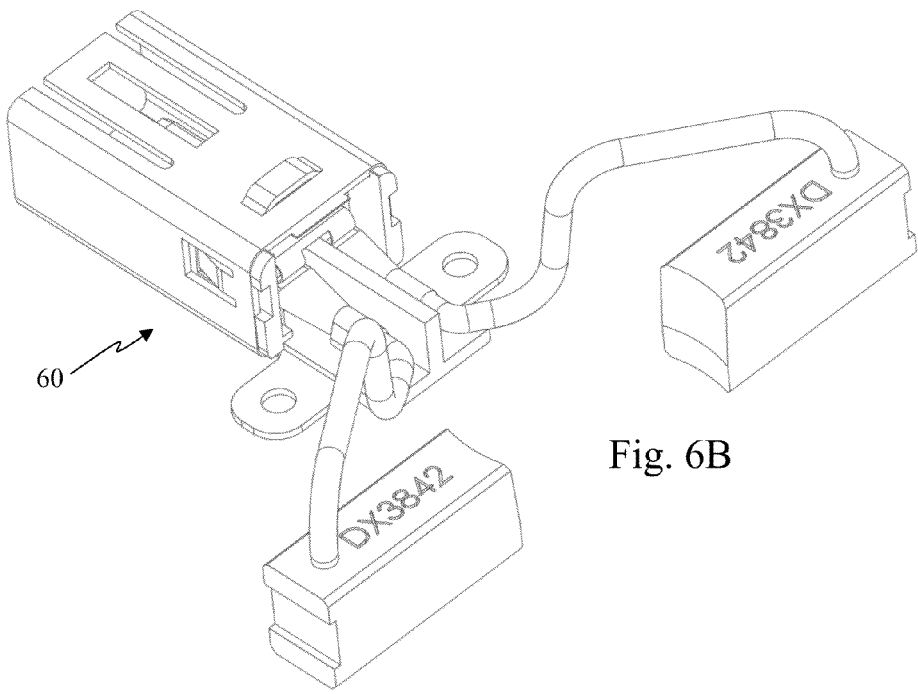

FIG. 5 shows an exploded view of an assembled electrical connector. Here, terminals 30 are crimped to leads 53 which are also electrically connected to brushes 51. The leads 53 may be an extension of brushes 51, or may be another electrically conductive element such as a wire or filament. In this embodiment, brushes 51 are configured to manipulate an electric motor. FIG. 6 shows multiple perspective view of the assembled electrical connector 60.

Figure 7A:
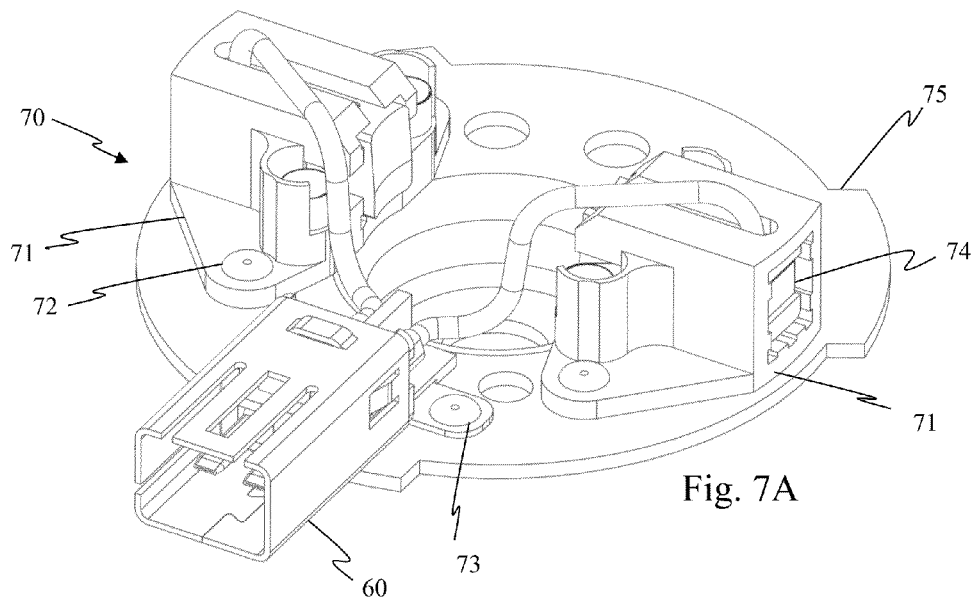
FIGS. 7A and 7B show multiple perspective views of an assembled electrical connector mounted to the base of an electric machine according to an exemplary embodiment of the invention.
Figure 7B:
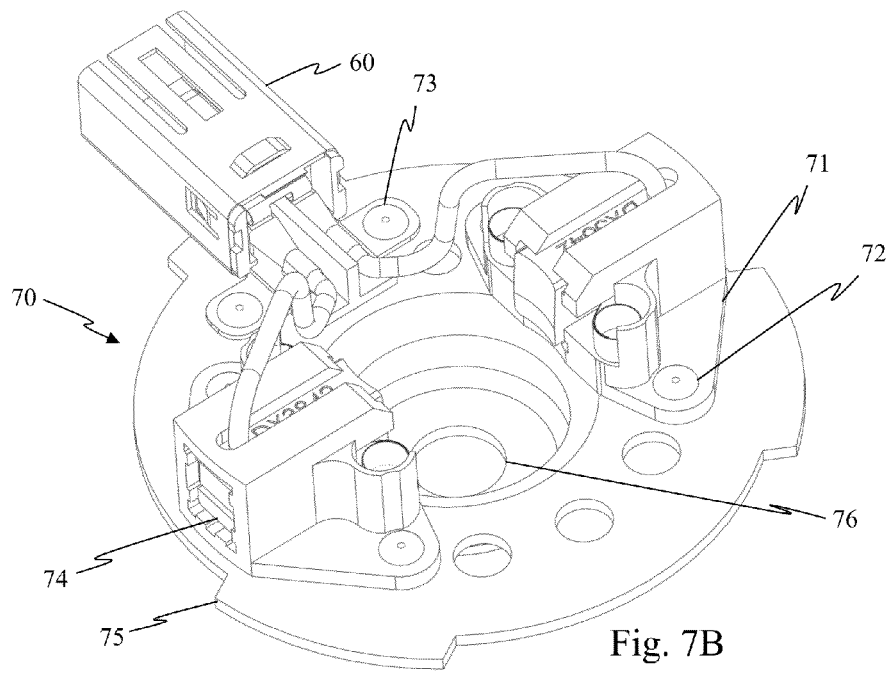

FIGS. 7A and 7B show multiple perspective views of an assembled electrical connector 60 mounted to the base of an electric machine. The base assembly 70 has one or more alignment flanges 75 configured to align the base with the electric machine. The base assembly 70 also comprises brush mounts 71 that hold the brushes 51 in place and in proper alignment. The brush mounts 71 are affixed to the base by fasteners 72. Fasteners 73 also affix the electrical connector 60 to the base. The base may be constructed from a conductive material. The inside surfaces of the brush tube may have ribs 74 rather than flat surfaces which contact the brush so that brush dust will be less likely to hang up the brush. The ribs 74 can also improve moldability and dimensional control. The resulting grooves in the two vertical sides may provide a place for a constant force brush spring.

Figure 8:
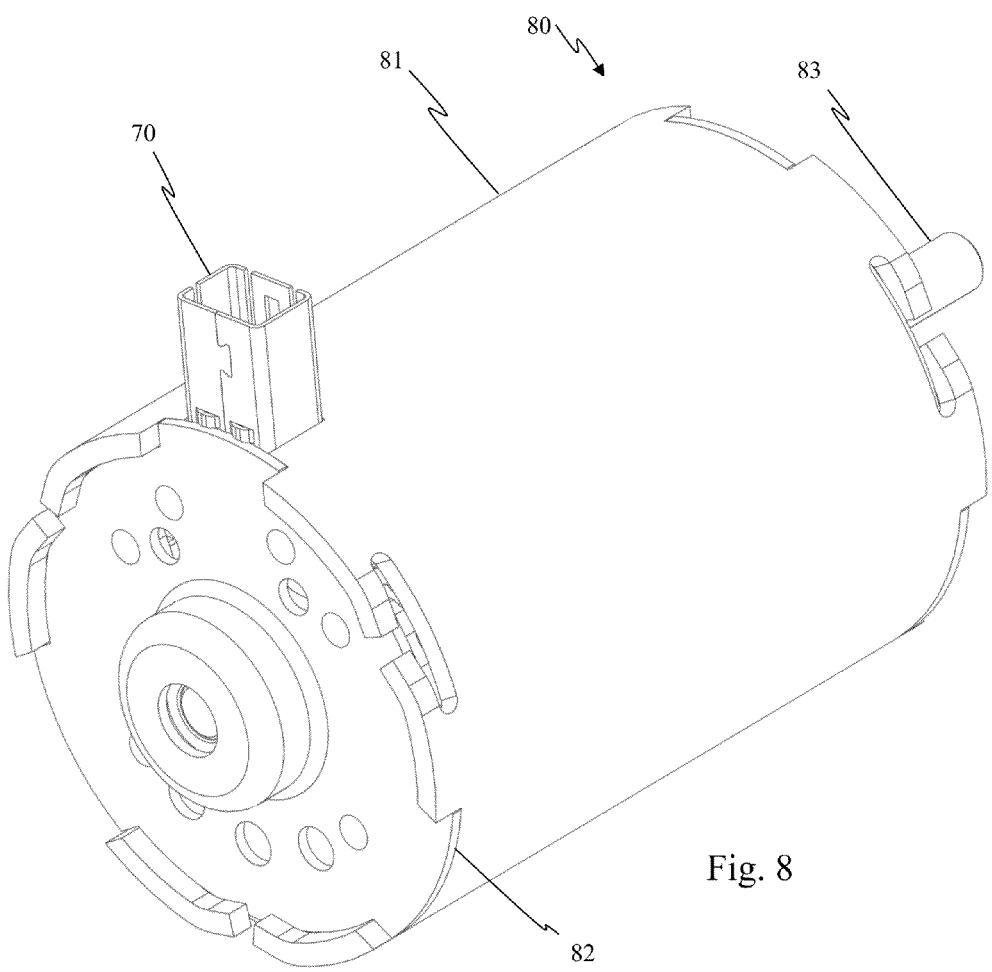
FIG. 8 shows a view of an electrical connector integrated into an electrical motor according to an embodiment of the invention.

FIG. 8 shows a view of an electrical connector integrated into an electrical motor 80. The electrical motor casing 81 surrounds the electrical motor and may also be constructed as a conductive material. By constructing the connector housing 40, the base assembly 70 and the electrical motor casing 81 from conductive materials, these pieces may act in conjunction as a common ground surrounding the motor. By surrounding the motor, these elements act as a Faraday cage, thus reducing (or eliminating) electromagnetic interference caused by an operating motor.

Figure 9:
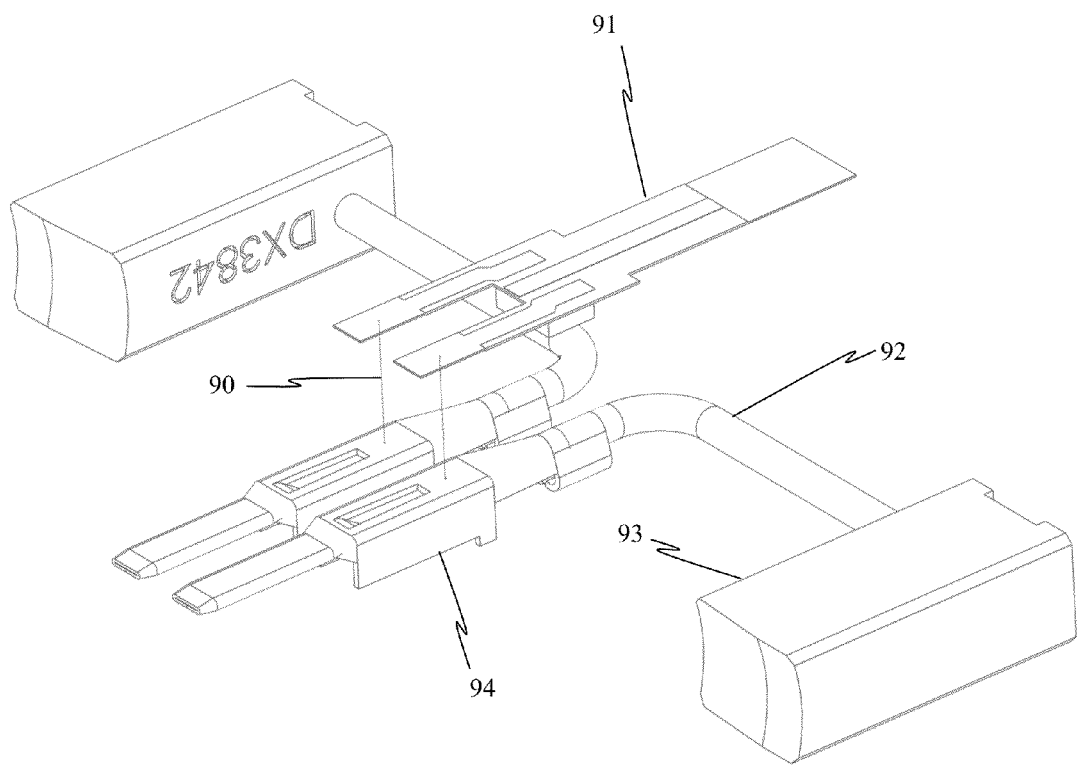
FIG. 9 shows the step of connecting the conductive pad of a flexible printed circuit board to a corresponding terminal according to an embodiment of the invention.

FIGS. 9-12 show one embodiment of a method of making the electrical connector. FIG. 9 shows electrically connecting 90 the flexible printed circuit board 91 to the terminals 94. The terminals are electrically connected (here, through crimping) to leads 92 and brushes 93.

Figure 10:
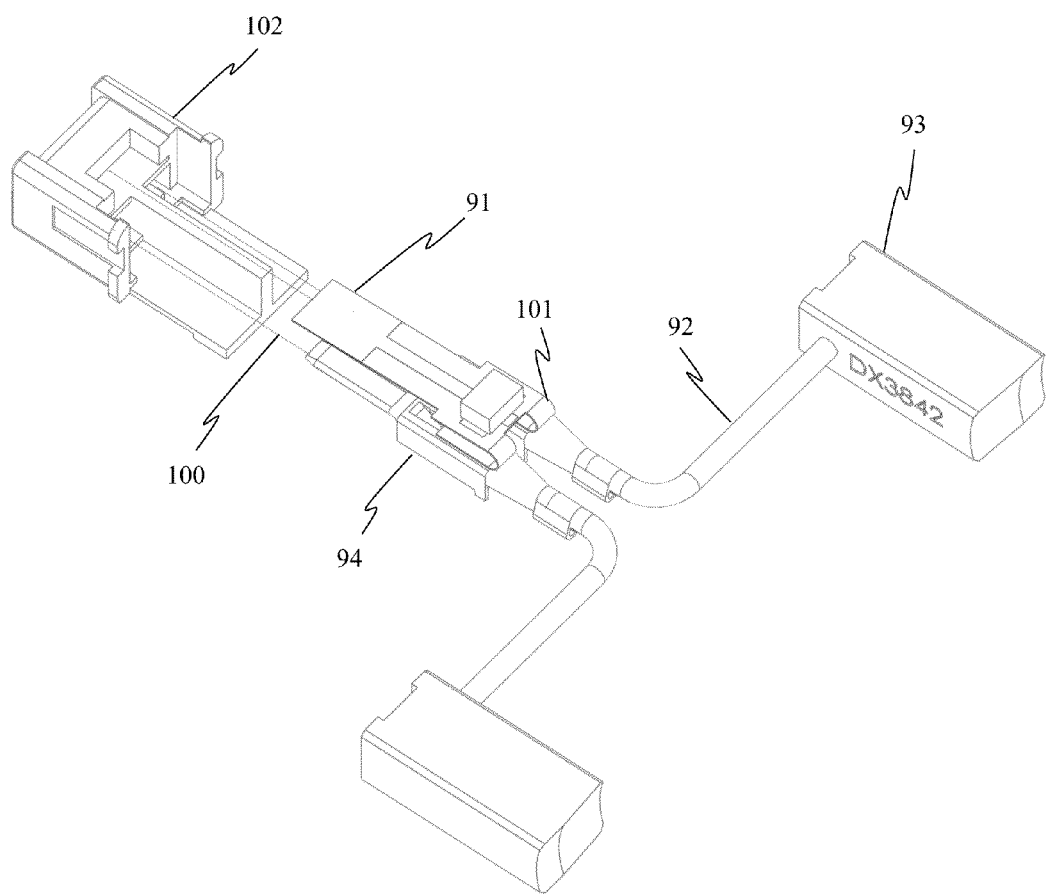
FIG. 10 shows the step of inserting each terminal into corresponding holders in a connector frame according to an embodiment of the invention.
Figure 11:
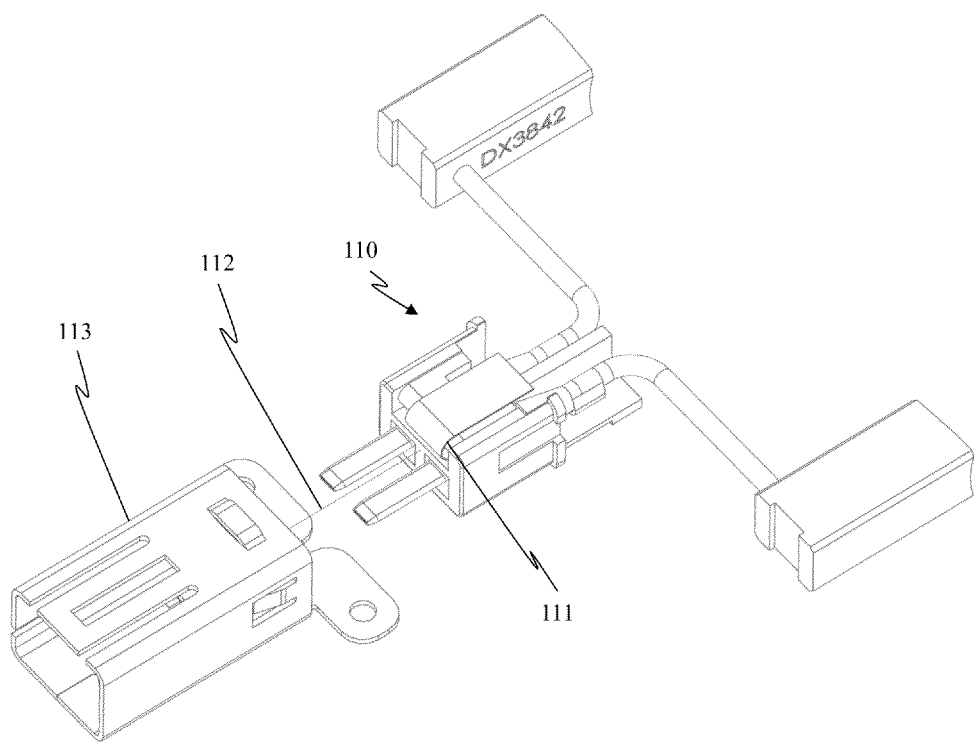
FIG. 11 shows the step of placing the flexible printed circuit board into a curved pathway of the connector frame and inserting the connector subassembly into a connector housing according to an embodiment of the invention.
Figure 12:
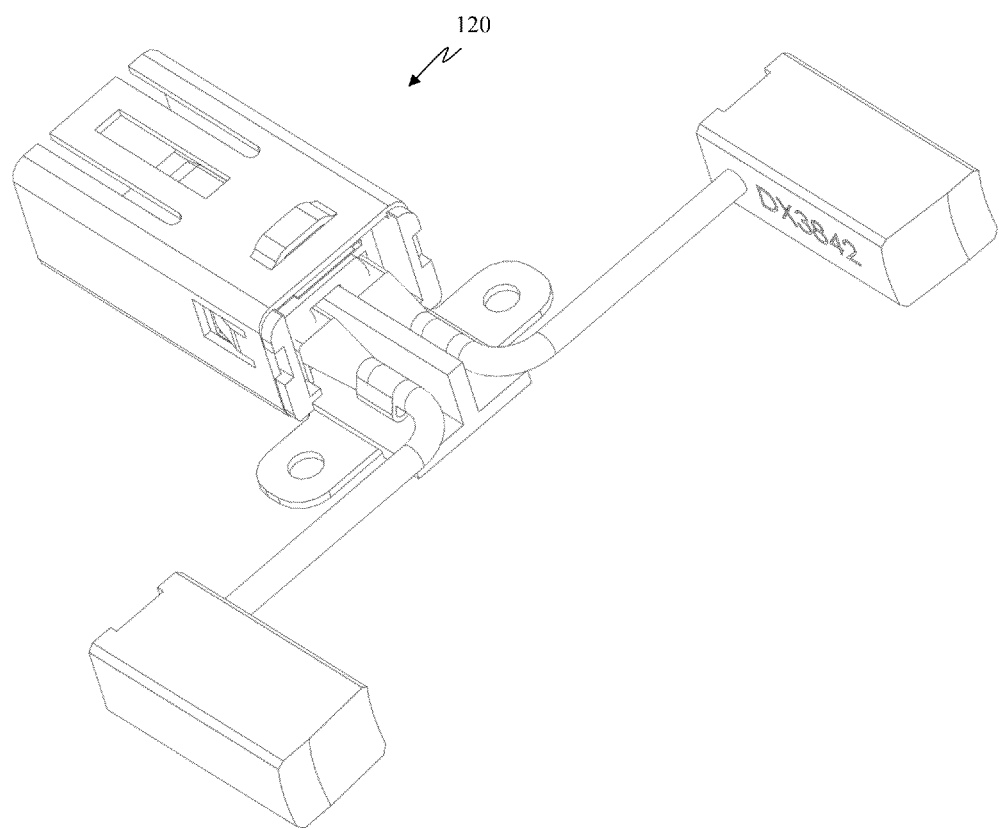
FIG. 12 shows an assembled electrical connector according to an embodiment of the present invention.

FIG. 10 shows folding 101 the flexible printed circuit board 91 for insertion 100 into the connector frame 102. After insertion 100, the flexible printed circuit board 91 is folded 111 once again above the connector frame 102. The connector frame assembly 110 is then inserted 112 into the connector housing 113. The final assembled electrical connector 120 is shown in FIG. 12.

Figure 13A:
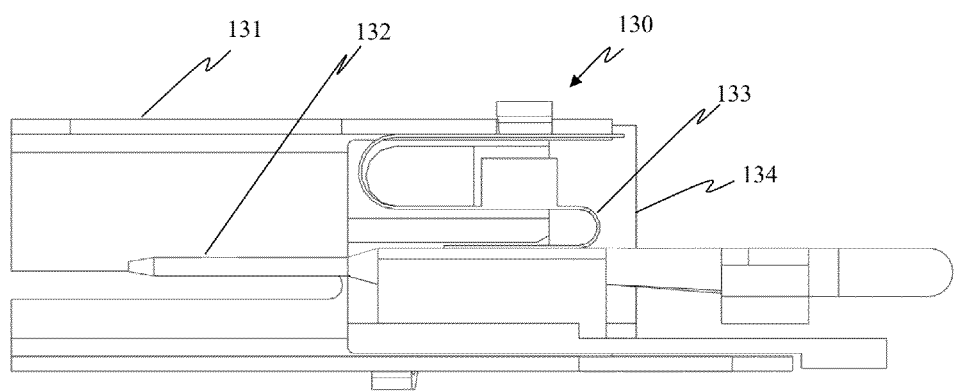
FIGS. 13A shows a wireframe cross-section and 13B shows a shaded cross-section of the assembled electrical connector according to an embodiment of the invention.
Figure 13B:
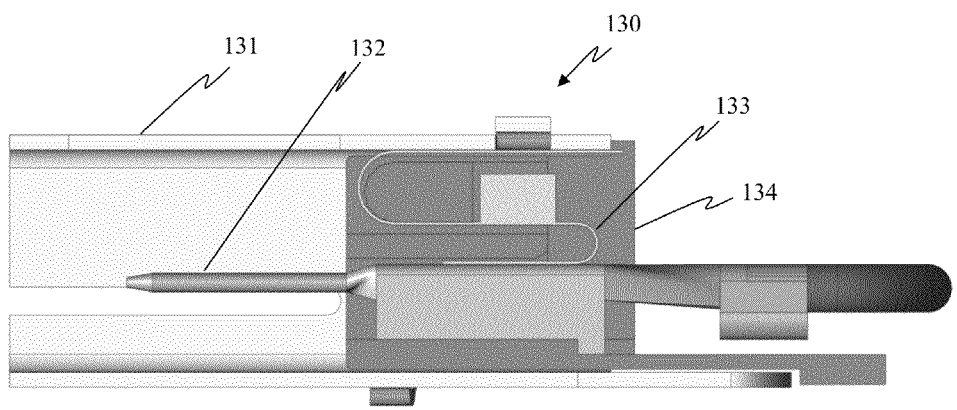
Figure 14:
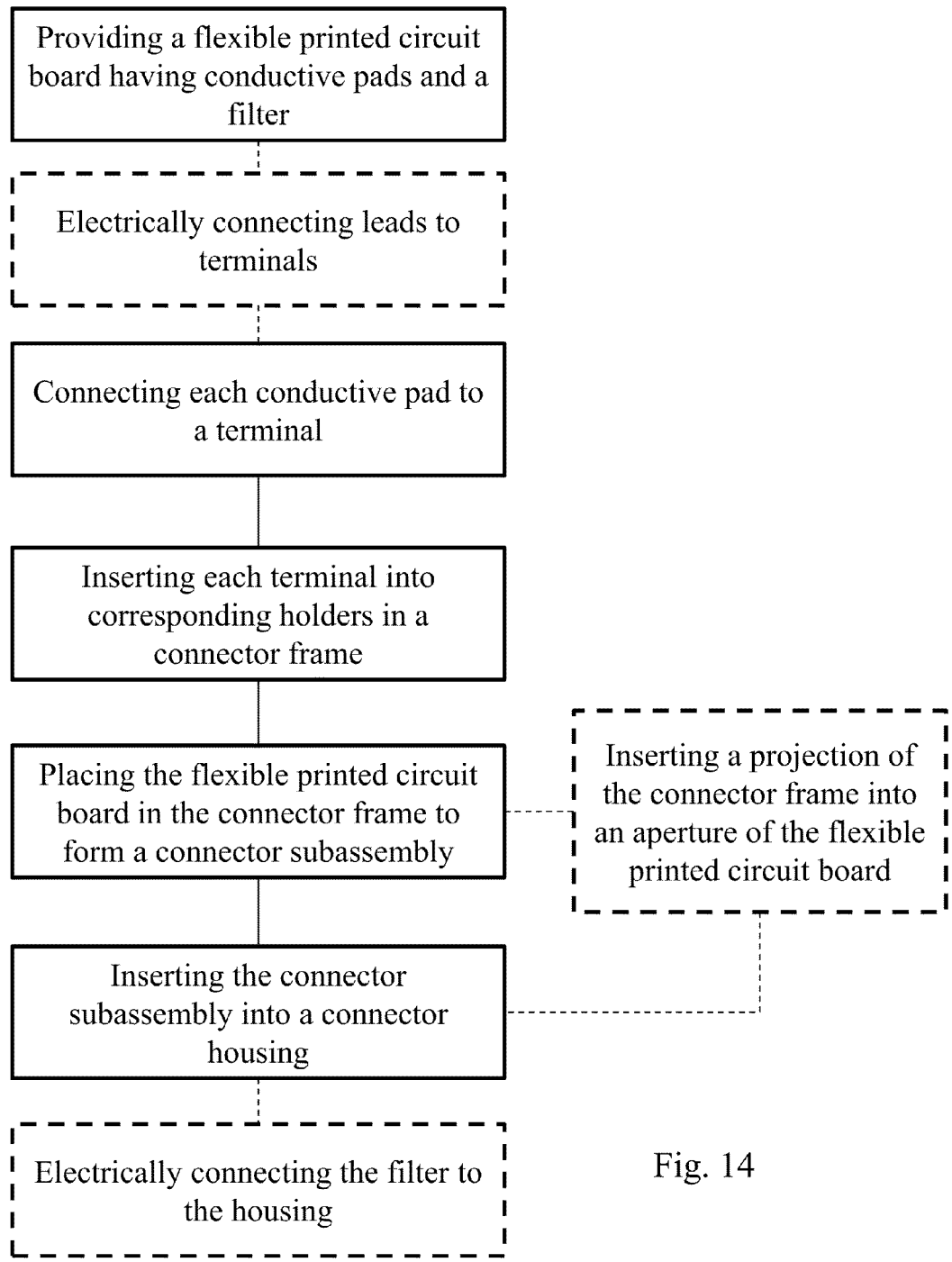
FIG. 14 is a flowchart showing a method of making an electrical connector according to an embodiment of the invention.

FIGS. 13A and 13B show, respectively, a wireframe cross-section and a shaded cross-section of the assembled electrical connector 130. In this embodiment, connector housing 131 encloses terminals 132, thereby protecting the terminals 132 from accidental contact. The flexible printed circuit board 133 is electrically connected to the terminals 132 and the electrical housing 131. For example, the flexible printed circuit board 133 may be electrically connected through soldering. The connector frame 134 is also located substantially within the connector housing 131.

The invention may also be embodied as a method 140 of making an electrical connector. The method 140 comprises the step of providing 141 a flexible printed circuit board having conductive pads and a filter. Conductive pad(s) are connected 143 to the terminal(s). Each terminal is inserted 144 into corresponding holders in a connector frame. The flexible printed circuit board is placed 145 in the connector frame to form a connector subassembly. The placement step 145 may comprise the substep of inserting 146 a projection of the connector frame into an aperture of the flexible printed circuit board. The connector subassembly is inserted 147 into a connector housing. In one embodiment, the filter is electrically connected 148 to the connector housing, for example, through the flexible printed circuit board. In another embodiment, a lead is electrically connected 142 to the terminal Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. An electrical connector for an electric machine, comprising:
   a connector frame;
   a flexible printed circuit board connected to the connector frame;
   a filter mounted to the flexible printed circuit board;
   at least one terminal mounted to the flexible printed circuit board and in electrical communication with the filter; and
   wherein the flexible printed circuit board is disposed in a curved pathway of the connector frame.

2. The electrical connector of claim 1, further comprising a connector housing configured such that the connector frame is substantially disposed within the connector housing.

3. The electrical connector of claim 2, wherein the filter is in electrical communication with a common ground by way of the connector housing.

4. The electrical connector of claim 1, wherein the connector frame has a projection and the flexible printed circuit board has an aperture capable of alignment with the projection of the connector frame.

5. The electrical connector of claim 1, wherein the filter is a three-node capacitor package.

6. The electrical connector of claim 1, wherein the flexible printed circuit board has a number of leg portions corresponding with the number of terminals.

7. The electrical connector of claim 6, wherein the at least one terminal is mounted to the flexible printed circuit board at the corresponding leg portion.

* * * * *